United States Patent
Chan

(10) Patent No.: US 10,498,223 B1
(45) Date of Patent: Dec. 3, 2019

(54) POWER SUPPLY CIRCUIT WITH IMPROVED POWER FACTOR

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/371,085

(22) Filed: Mar. 31, 2019

(30) Foreign Application Priority Data

Sep. 19, 2018 (TW) .............................. 107132908 A

(51) Int. Cl.
| | |
|---|---|
| *H02M 1/42* | (2007.01) |
| *H02M 7/162* | (2006.01) |
| *H02M 1/10* | (2006.01) |

(52) U.S. Cl.
CPC ........... *H02M 1/4208* (2013.01); *H02M 1/10* (2013.01); *H02M 1/4225* (2013.01); *H02M 7/1623* (2013.01)

(58) Field of Classification Search
CPC .............................. H02M 1/4225; H02M 1/10
See application file for complete search history.

(56) References Cited

U.S. PATENT DOCUMENTS

| | | | | |
|---|---|---|---|---|
| 5,818,707 | A * | 10/1998 | Seong ................ | H02M 1/14225 363/89 |
| 6,140,777 | A * | 10/2000 | Wang .................. | H02M 1/4225 315/224 |
| 9,154,030 | B2 | 10/2015 | Bianco | |
| 2004/0263140 | A1* | 12/2004 | Adragna ................... | G05F 1/70 323/282 |
| 2008/0002439 | A1* | 1/2008 | Allinder .............. | H02M 1/4208 363/21.01 |
| 2010/0165683 | A1* | 7/2010 | Sugawara ........... | H02M 1/4225 363/126 |
| 2011/0122664 | A1* | 5/2011 | Yabuzaki ................ | H02M 1/32 363/53 |

(Continued)

FOREIGN PATENT DOCUMENTS

| | | |
|---|---|---|
| EP | 3 145 067 A2 | 3/2017 |
| TW | 200607221 | 2/2006 |

(Continued)

*Primary Examiner* — Yusef A Ahmed
*Assistant Examiner* — Ishrat F Jamali
(74) *Attorney, Agent, or Firm* — Winston Hsu

(57) ABSTRACT

A power supply circuit includes: an alternating current-to-direct current (AC-to-DC) converter, a transformer, a first current switch, a switch control circuit and a power factor enhancement circuit. The AC-to-DC converter converts an AC power signal into a DC power signal. The transformer includes a primary side and a secondary side, where a first terminal of the primary side is coupled to the AC-to-DC converter, a second terminal of the secondary side is coupled to a ground voltage level, a first terminal of the first current switch is coupled to a second terminal of the primary side, and a second terminal of the first current switch is coupled to the ground voltage level through an impedance component. The power factor enhancement circuit selectively adjusts a zero current detection voltage to make the switch control circuit set the first current switch to be in a conducting state.

16 Claims, 3 Drawing Sheets

(56) References Cited

U.S. PATENT DOCUMENTS

2013/0010508 A1\* 1/2013 Courtel .............. H02M 1/4225
                                                          363/84
2017/0207695 A1   7/2017 Bianco

FOREIGN PATENT DOCUMENTS

TW      201511451 A    3/2015
WO    2011/052197 A1   5/2011
WO    2014/115618 A1   7/2014

\* cited by examiner

POWER SUPPLY CIRCUIT WITH IMPROVED POWER FACTOR

BACKGROUND OF THE INVENTION

1. Field of the Invention

The present invention relates to a power supply circuit, and more particularly, to a power supply circuit capable of improving the power factors of a high input voltage.

2. Description of the Prior Art

Many industry standards are made for standardizing the power efficiency of electronic products in order to achieve the goal of saving energy. For example, some of the industry standards require the power factor of a power supply circuit to be 0.9 or above. Most of the electronic products comply with the input voltage of 100-240 volts (V), and when the input voltage is lower, the requirement of the high power factor can be fulfilled more easily. However, when the input voltage is higher, it is hard to fulfill the requirement of the high power factor. When an electronic product adopts a high input voltage, the input current thereof is relatively small in comparison with an input current under a low input voltage. Hence, the goal of correcting the power factor cannot be achieved effectively, making the power factor fail to meet the related requirements of energy saving. Therefore, there is a need for a novel method and associated architecture to improve the power factor under the high input voltage.

SUMMARY OF THE INVENTION

An objective of the present invention is to provide a power supply circuit capable of improving the power factor under a high input voltage, in order to solve the aforementioned problem.

At least one embodiment of the present invention provides a power supply circuit which is arranged to provide power to a load. The power supply circuit comprises an alternating current-to-direct current (AC-to-DC) converter, a transformer, a first current switch, a switch control circuit and a power factor enhancement circuit. The AC-to-DC converter may be arranged to covert an AC power signal into a DC power signal. The transformer comprises a primary side and a secondary side, wherein a first terminal of the primary side is coupled to the AC-to-DC converter, a second terminal of the secondary side is coupled to a ground voltage level, a first terminal of the first current switch is coupled to a second terminal of the primary side of the transformer, and a second terminal of the first current switch is coupled to the ground voltage level through an impedance component. The switch control circuit is coupled to a first terminal of the secondary side of the transformer, a control terminal of the first current switch and the second terminal of the first current switch, for setting the first current switch to be in a conducting state or a non-conducting state. The power factor enhancement circuit is coupled to the AC-to-DC converter and the first terminal of the secondary side of the transformer. In addition, when the switch control circuit determines that a detection voltage on the second terminal of the first current switch is greater than a first predetermined voltage, the switch control circuit sets the first current switch to be in the non-conducting state. When the switch control circuit determines that a zero-current detection voltage at the first terminal of the secondary side of the transformer is less than a second predetermined voltage, the switch control circuit sets the first current switch to be in the conducting state. Additionally, when the DC power signal is greater than a predetermined input voltage level, the power factor enhancement circuit sets the zero-current detection voltage to be less than the second predetermined voltage in order to make the switch control circuit set the first current switch to be in the conducting state.

An advantage of the present invention is that the power supply circuit can effectively enhance the power factor within the entire input voltage range, thereby enhancing the power consuming efficiency of the electronic product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
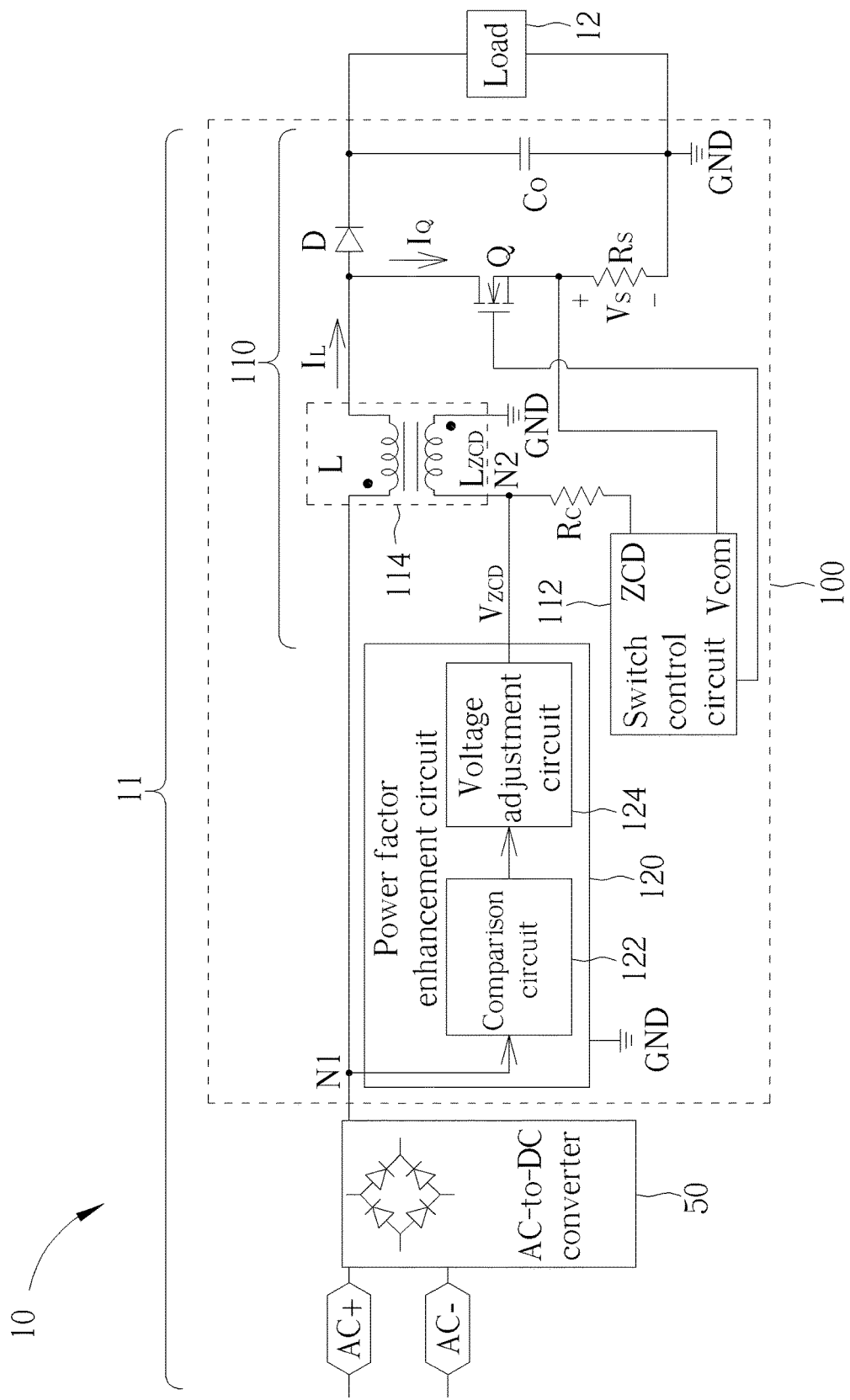
FIG. 1 is a diagram illustrating an electronic device according to an embodiment of the present invention.

FIG. 1 is a diagram illustrating an electronic device 10 according to an embodiment of the present invention. The electronic device 10 may comprise a power supply circuit 11 which comprises a load 12, and the power supply circuit 11 may comprise a set of AC power terminal such as the terminals {AC+, AC−}, an alternating current-to-direct current (AC-to-DC) converter 50, and a DC control circuit 100, wherein the components in the DC control circuit 100 may be divided into an active power factor corrector 110 and a power factor enhancement circuit 120. The power supply circuit 11 may provide power to the load 12. For better comprehension, the power supply circuit 11 may provide power to other circuits in the electronic device 10 via a set of power output terminals. In this embodiment, the other circuits may be illustrated as the load 12 in a simplified manner, for better understanding.

As shown in FIG. 1, the active power factor corrector 110 may comprise a switch control circuit 112, a transformer 114, a current switch Q, an impedance component $R_S$, a diode D and a capacitor Co, wherein the transformer 114 comprises a primary side and a secondary side. For better comprehension, the respective coils of the primary side and the secondary side of the transformer 114 (e.g. a main coil and an auxiliary coil) may be regarded as the inductors L and $L_{ZCD}$, respectively. A first terminal and a second terminal of the primary side (e.g. the inductor L), such as its left-hand side terminal and right-hand side terminal, are respectively coupled to the AC-to-DC converter 50 and the diode D. A first terminal and a second terminal of the secondary side (e.g. the inductor $L_{ZCD}$), such as its left-hand side terminal and right-hand side terminal, are respectively coupled to the switch control circuit 112 and a ground voltage level (which may be expressed with the ground GND). A first terminal of the current switch Q (e.g. its upper terminal) is coupled to the second terminal of the primary side (e.g. the right-hand side terminal of the inductor L) of the transformer 114, and a second terminal of the current switch Q (e.g. its lower terminal) is coupled to the ground voltage level (which may be expressed with the ground GND) through the impedance component $R_S$. The switch control circuit 112 is coupled to the first terminal of the secondary side of the transformer 114 (e.g. the left-hand side terminal of the inductor $L_{ZCD}$), a control terminal of the current switch Q (e.g. its left-hand side terminal), and the second terminal of the current switch Q (i.e. its lower terminal), in order to set the current switch Q to be in a conducting state or a non-conducting state. Further, the power factor enhancement circuit 120 is coupled to the AC-to-DC converter 50 and the first terminal of the secondary side of the transformer 114 (e.g. the left-hand side terminal of the inductor $L_{ZCD}$). The power factor enhancement circuit 120 may comprise a comparison circuit 122 coupled to the AC-to-DC converter 50, and a voltage adjustment circuit 124 coupled to the comparison circuit 122 and the first terminal of the secondary side of the transformer 114 (e.g. the left-hand side terminal of the inductor $L_{ZCD}$). In the aforementioned embodiment, the AC-to-DC converter 50 may be implemented with a bridge rectifier or other suitable circuit architecture. The current switch Q may be implemented with a transistor or one of some other circuit components. The impedance component $R_S$ may be implemented with a resistor or one of some other circuit components.

According to this embodiment, the AC-to-DC converter 50 may convert at least one AC power signal received from the terminals {AC+, AC−} into a DC power signal, and may transmit the DC power signal to the active power factor corrector 110 via the terminal N1. The active power factor corrector 110 may correct the power factor, and more particularly, may perform detection to generate multiple detection signals (such as the zero-current detection voltage $V_{ZCD}$ and the detection voltage $V_S$), and perform switching control according to these detection signals to convert the DC power signal into an output power signal (e.g. the DC power signal at another voltage level), in order to provide power to the load 12. Based on the switching control, the current switch Q is turned on and off alternately, in order to switch between the conducting state and the non-conducting state. For example, the DC power signal may flow through the primary side of the transformer 114, and the transformer 114 may generate the zero-current detection voltage $V_{ZCD}$ at the secondary side of the transformer 114. The switch control circuit 112 may receive the detection voltage $V_S$ between the two terminals of the impedance component $R_S$ and the zero-current detection voltage $V_{ZCD}$ via the terminals Vcom and ZCD, respectively. When the switch control circuit 112 determines that the detection voltage $V_S$ at the second terminal of the current switch Q is greater than a first predetermined voltage (e.g. the target voltage value Vcom), the switch control circuit 112 may set the current switch Q to be in the non-conducting state. When the switch control circuit 112 determines that the zero-current detection voltage $V_{ZCD}$ at the first terminal of the secondary side of the transformer 114 is less than a second predetermined voltage (e.g. a low voltage level such as 0.3 V), the switch control circuit 112 may set the current switch Q to be in the conducting state.

Further, the power factor enhancement circuit 120 may obtain the DC power signal from the terminal N1, and may dynamically adjust the zero-current detection voltage $V_{ZCD}$ according to the DC power signal, in order to guide the active power factor corrector 110 to enhance the power factor. When the DC power signal is greater than a predetermined input voltage level, the power factor enhancement circuit 120 may set the zero-current detection voltage $V_{ZCD}$ to be less than the second predetermined voltage (e.g. the low voltage level such as 0.3 V), making the switch control circuit 112 set the current switch Q to be in the conducting state. For example, the comparison circuit 122 may compare the DC power signal with the predetermined input voltage level, and detect whether the DC power signal reaches the predetermined input voltage level or not, to correspondingly generate a control signal. The voltage adjustment circuit 124 may dynamically adjust the voltage level of the zero-current detection voltage $V_{ZCD}$ according to the control signal, in order to control the active power factor corrector 110 to enhance the power factor. Since the voltage adjustment circuit 124 is coupled to the secondary side of the transformer 114 via the terminal N2, the voltage level at the terminal N2 may be equal to the voltage level of the zero-current detection voltage $V_{ZCD}$. When the comparison circuit 122 determines that the DC power signal is greater than the predetermined input voltage level, in response to the control signal that indicates this situation, the voltage adjustment circuit 124 may set the zero-current detection voltage $V_{ZCD}$ to be less than the second predetermined voltage in order to make the switch control circuit 112 set the current switch Q to be in the conducting state.

Regarding the active power factor corrector 110, in a situation where the zero-current detection voltage $V_{ZCD}$ has not been adjusted by the power factor enhancement circuit 120, the zero-current detection voltage $V_{ZCD}$ may be arranged to indicate whether the current of the DC power signal approaches zero. Under the high input voltage, the power factor enhancement circuit 120 may accelerate triggering the active power factor corrector 110 to turn on the current switch Q via setting the value of the zero-current detection voltage $V_{ZCD}$, in order to enhance the power factor. For example, before the current of the DC power signal approaches zero, the power factor enhancement circuit 120 may alter the zero-current detection voltage $V_{ZCD}$ to immediately enter a predetermined range, in order to forcibly make the zero-current detection voltage $V_{ZCD}$ indicate that the current of the DC power signal approaches zero. Hence, under the high input voltage, the architecture of the aforementioned embodiment can still effectively enhance the power factor.

Based on the architecture shown in FIG. 1, the power supply circuit 11 may be suitable for all kinds of AC voltages in various countries/areas. No matter whether a low-line AC voltages or high-line AC voltages is applied to the terminals {AC+, AC−}, the power supply circuit 11 can properly operate to maintain the power factor at a high value (e.g. 0.9 or above). For example, the power supply circuit 11 may be applicable to low-line AC voltages such as that in the voltage range of 100 V to 120 V. In this situation, the power supply circuit 11 may rely on the active power factor correction of the active power factor corrector 110 to reach a high power factor such as 0.9 or above, having no need to rely on the power factor enhancement of the power factor enhancement circuit 120, wherein the active power factor corrector 110 can control the input current to be approximately sinusoidal, and keep the input current in phase with the input voltage, which means the input current has the same phase as that of the input voltage). In another example, the power supply circuit 11 may be applicable to high-line AC voltages such as that in the voltage range of 200 V to 240V. In this situation, the power supply circuit 11 may rely on the active power factor correction of the active power factor corrector 110 and the power factor enhancement of the power factor enhancement circuit 120 to reach a high power factor such as 0.9 or above, wherein with the aid of the power factor enhancement circuit 120, the active power factor corrector 110 can control the input current to be approximately sinusoidal, and keep the input current in phase with the input voltage, which means the input current has the same phase as that of the input voltage.

In the aforementioned embodiment, the switch control circuit 112 may be implemented with a power management integrated circuit, an application-specific integrated circuit (ASIC), etc.

According to some embodiments, the switch control circuit 112 may adopt a predetermined modulation to set the current switch Q to be in the conducting state or the non-conducting state. Examples of the predetermined modulation may include, but are not limited to: pulse width modulation (PWM) and pulse frequency modulation (PFM).

Figure 2:
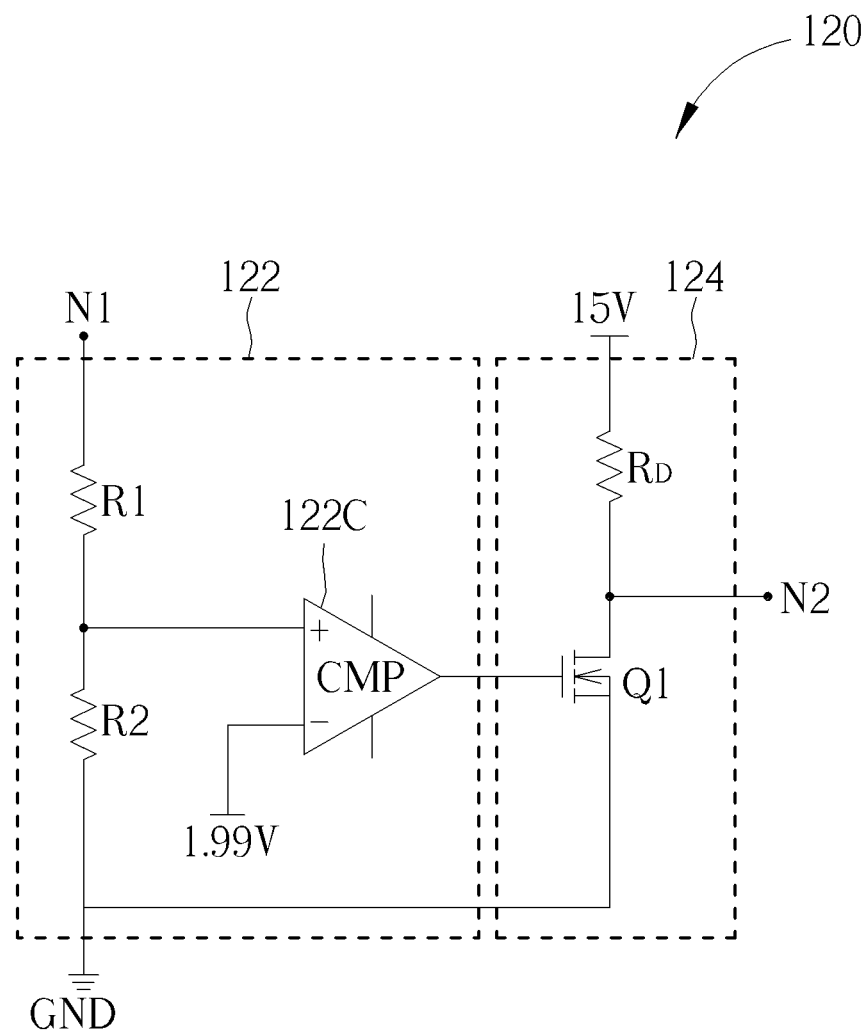
FIG. 2 illustrates an example of the power factor enhancement circuit shown in FIG. 1.

FIG. 2 illustrates an example of the power factor enhancement circuit 120 shown in FIG. 1. The comparison circuit 122 may comprise a voltage dividing circuit such as that formed with a set of resistors {R1, R2}, and a comparator 122C (labeled "CMP" for better understanding) coupled to the voltage dividing circuit. The voltage adjustment circuit 124 may comprise a current switch Q1 (e.g. a transistor) coupled to the comparator 122C, and a resistor $R_D$ coupled to the current switch Q1. In the architecture shown in FIG. 1, the power factor enhancement circuit 120 is coupled to the first terminal of the secondary side of the transformer 114 via the terminal N2, and therefore the current switch Q1 in this embodiment is coupled between the first terminal at the secondary side of the transformer 114 and the ground voltage level (which may be expressed with the ground GND), wherein the comparison circuit 122 and a control terminal of the current switch Q1 (e.g. the left-hand side terminal thereof) are coupled to each other. When the comparison circuit 122 determines that the DC power signal is greater than the predetermined input voltage level, the comparison circuit 122 may set the current switch Q1 to be in a conducting state, in order to make the zero-current detection voltage $V_{ZCD}$ be less than the second predetermined voltage, thereby making the switch control circuit 112 set the current switch Q to be in the conducting state. When the comparison circuit 122 determines that the DC power signal is less than the predetermined input voltage level, the comparison circuit 122 may set the current switch Q1 to be in a non-conducting state.

According to this embodiment, the voltage dividing circuit such as the set of resistors {R1, R2} may obtain the DC power signal from the terminal N1, and may perform voltage division according to the DC power signal in order to generate an intermediate voltage signal, and more particularly, may output the intermediate voltage signal to the comparator 122C via the terminal between the resistors R1 and R2. The comparator 122C may receive the intermediate voltage signal and a predetermined voltage level (e.g. 1.99 V) via its non-inverting input terminal and inverting input terminal (respectively labeled "+" and "−" for better understanding), respectively, and may compare a voltage level of the intermediate voltage signal with the predetermined voltage level to generate a comparison result, wherein the control signal at the output terminal of the comparator 122C carries the comparison result. As a result, the comparison circuit 122 may control the voltage adjustment circuit 124 through the control signal, and more particularly, control whether the voltage adjustment circuit 124 adjusts the zero-current detection voltage $V_{ZCD}$ or not.

Further, the current switch Q1 may selectively pull down the zero-current detection voltage $V_{ZCD}$ according to the control signal. When the comparison result indicates that the voltage level of the intermediate voltage signal is greater than the predetermined voltage level (e.g. 1.99 V), which means the DC power signal is greater than the predetermined input voltage level, the comparison circuit 122 may turn on the current switch Q1 to pull down the zero-current detection voltage $V_{ZCD}$ to be less than or equal to the second predetermined voltage (e.g. the low voltage level such as 0.3 V). when the comparison result indicates that the voltage level of the intermediate voltage signal is less than the predetermined voltage level (e.g. 1.99 V), which means the DC power signal is less than the predetermined input voltage level, the comparison circuit 122 may turn off the current switch Q1 to prevent pulling down the zero-current detection voltage $V_{ZCD}$. In this embodiment, the respective resistance values R1 and R2 of the resistors R1 and R2 (note that the resistance values are expressed with the associated symbols in italics, respectively) may be designed to have the following relationship:

$$(R1+R2):R2=100:1$$

wherein the voltage dividing circuit such as the set of resistors {R1, R2} may obtain 1% of the voltage level of the DC power signal to be the voltage level of the intermediate voltage signal. For example, the respective resistance values R1, R2 and $R_D$ of the resistors R1, R2 and $R_D$ may be 99 kilo-ohm (kΩ), 1 kΩ and 10 kΩ respectively. In this situation, when the voltage level of the DC power signal is greater than 199 V (e.g. reaching 200 V) to cause the voltage level of the intermediate voltage signal to be greater than 1.99 V, the comparison result outputted by the comparator 122C may be a high level of the control signal, making the current switch Q1 be in the conducting state. As a result, the current switch Q1 may pull down the zero-current detection voltage $V_{ZCD}$ at the terminal N2, for example, pull it down to the low voltage level such as 0.3 V. When the voltage level of the DC power signal is less than 199 V to cause the voltage level of the intermediate voltage signal to be less than 1.99 V, the comparison result outputted by the comparator 122C may be a low level of the control signal, making the current switch Q1 be in the non-conducting state. As a result, the current switch Q1 does not pull down the zero-current detection voltage $V_{ZCD}$ at the terminal N2.

According to some embodiments, the architecture shown in FIG. 2 may be modified. For example, the resistance values R1, R2, and/or $R_D$ may be modified (e.g. increased or decreased). In another example, the ratio ((R1+R2)/R2), and/or the predetermined voltage level (such as 1.99 V) may be modified (e.g. increased or decreased). Hence, the architecture of the aforementioned embodiment may be implemented based on different design requirements, to enable the power factor enhancement circuit 120 only when the input voltage is greater than a predetermined value, in order to achieve the goal of enhancing the power factor.

Some details related to the power supply circuit 11 are further described as follows. According to some embodiments, the active power factor corrector 110 (e.g. the switch control circuit 112) may control or set the target of the active power factor correction, such as one or more target current values that may vary with respect to time. More particularly, the active power factor corrector 110 (e.g. the switch control circuit 112) may monitor the waveform of the DC power signal at the terminal N1 and/or a similar waveform thereof, and calculate the product of the magnitude of the similar waveform (e.g. one or more waveform sample values) and the magnitude of the feedback signal from the power output terminal to be the target (e.g. the target current values), wherein a series of waveform sample values of the similar waveform may comprise voltage sample values obtained by sampling the voltage dividing signal of the DC power signal. Further, when performing the switching control, the switch control circuit 112 may utilize the target as the upper limit of increasing the current $I_L$. For example, when the switch control circuit 112 turns on the current switch Q (which may be regarded as a power switch), the inductor L may store energy, and the current $I_L$ may increase correspondingly, wherein the current $I_Q$ is equal to the current $I_L$. In another example, when the switch control circuit 112 turns off the current switch Q, the inductor L may output energy stored therein to charge the capacitor Co (which may be regarded as an output capacitor) via the diode D and provide energy to the load 12, and the current $I_L$ may drop correspondingly. When performing the switching control, the switch control circuit 112 may control the current switch Q to be in the conducting state or the non-conducting state according to the detection voltage $V_S$ and the zero-current detection voltage $V_{ZCD}$. When the current switch Q is in the conducting state, the current $I_Q$ may flow through the impedance component $R_S$ (which may have a resistance value $R_S$, expressed with the associated symbol in italic), making the detection voltage $V_S$ have a non-zero value as follows:

$$V_S=(I_Q*R_S)=(I_L*R_S);$$

wherein $I_Q=I_L$. Since the detection voltage $V_S$ is proportional to the current $I_L$, the switch control circuit 112 may compare the detection voltage $V_S$ received from the terminal Vcom with the target voltage value Vcom that corresponds to the target, to monitor whether the current $I_L$ reaches the target (e.g. the target current value then, such as that at a certain moment) or not. When the detection voltage $V_S$ is greater than the target voltage value Vcom (which means the current $I_L$ reaches this target current value), the switch control circuit 112 may turn off the current switch Q. As a result, the polarization of the main coil (e.g. the inductor L) of the transformer 114 may be reversed based on Lenz's law, and the zero-current detection voltage $V_{ZCD}$ generated on the auxiliary coil (e.g. the inductor $L_{ZCD}$) of the transformer 114 may be detected by the switch control circuit 112. When the main coil (such as the inductor L) releases energy (e.g. the current $I_L$ decreases correspondingly), the state of the auxiliary coil (such as inductor $L_{ZCD}$) may change correspondingly, and therefore the zero-current detection voltage $V_{ZCD}$ may also decrease correspondingly. The switch control circuit 112 may comprise a flip-flop (FF) such as an RS flip-flop, for controlling the current switch Q to be in the conducting state or the non-conducting state, and may perform the switching control through switching the state of the flip-flop, to switch the conducting state or the non-conducting state of the current switch Q. For example, when the zero-current detection voltage $V_{ZCD}$ decreases to the second predetermined voltage (e.g. 0.3 V) or below, the switch control circuit 112 may trigger switching the state of the flip-flop, to turn on the current switch Q, wherein the operation of detecting whether the zero-current detection voltage $V_{ZCD}$ decreases to the second predetermined voltage (or below) may be regarded as zero current detection. In addition, the resistor Rc may be used as a current-limiting resistor, and its resistance value Rc (expressed with the associated symbol in italic) may be 63 kΩ. In some embodiments, the resistance value Rc may be modified.

Figure 3:
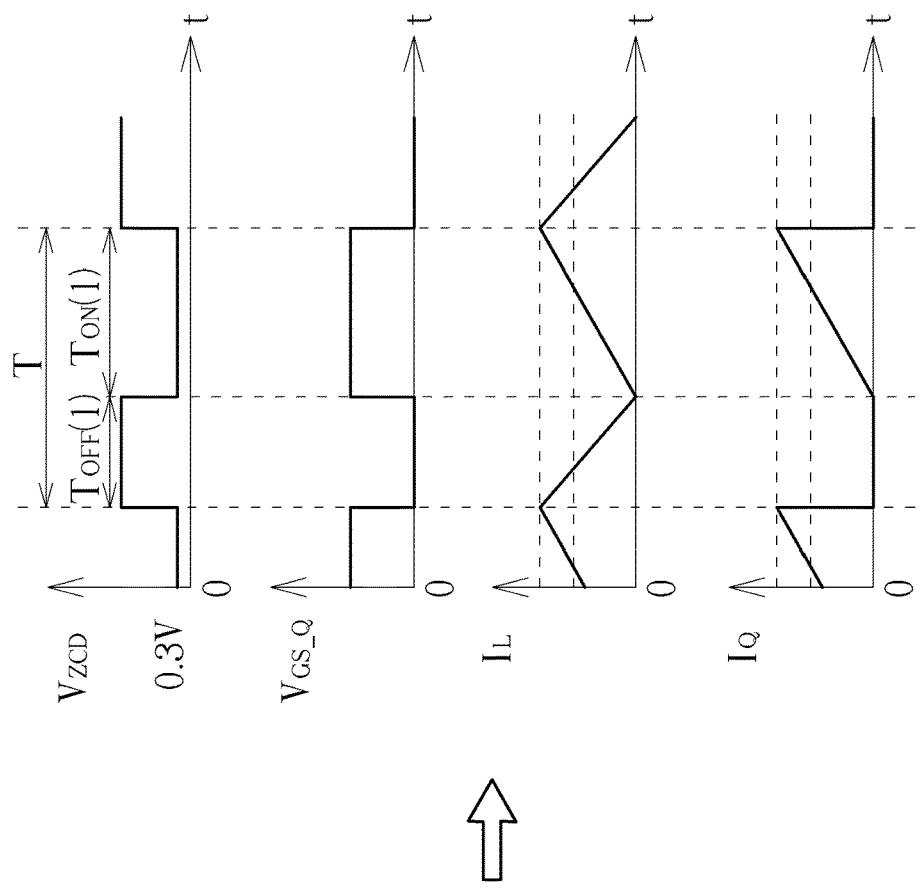
FIG. 3 illustrates some examples of associated signals of the architecture shown in FIG. 1.
Figure 3:
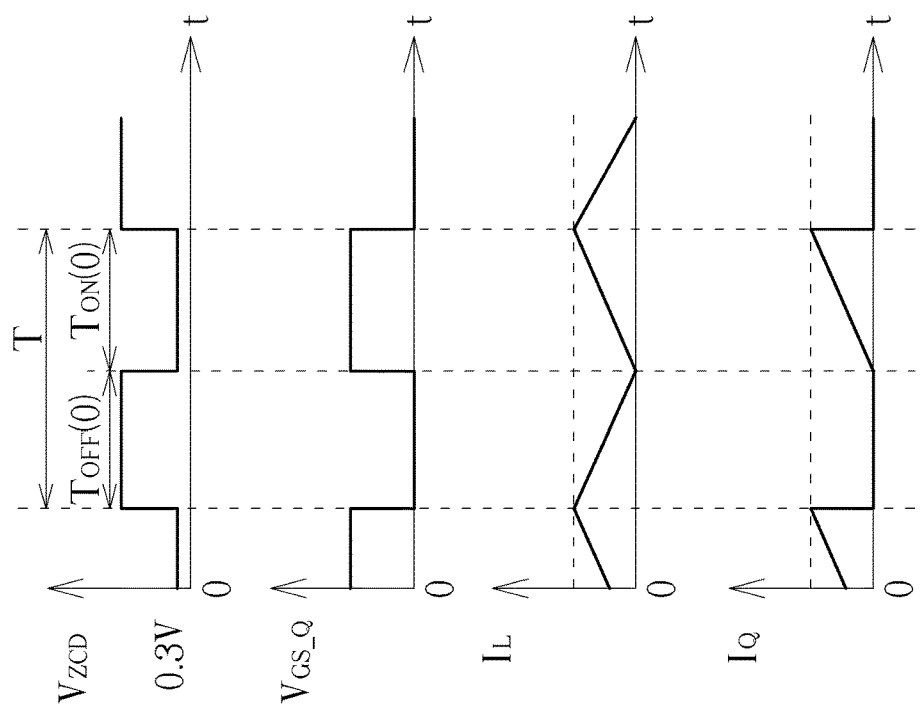

FIG. 3 illustrates some examples of associated signals (e.g. the voltages $\{V_{ZCD}, V_{GS\_Q}\}$ and the currents $\{I_L, I_Q\}$) of the architecture shown in FIG. 1. The curve at the left half of FIG. 3 may correspond to the case of lacking of the aforementioned power factor enhancement (e.g. the function of the power factor enhancement circuit 120 is disabled, or the power factor enhancement circuit 120 is not implemented). The curve at the right half of FIG. 3 may correspond to the case that the power factor enhancement is performed (e.g. the function of the power factor enhancement circuit 120 is enabled, or the power factor enhancement circuit 120 is implemented). The voltage $V_{GS\_Q}$ may represent the voltage between the gate terminal and the source terminal of the current switch Q, and the turning-off intervals (such as $\{T_{OFF}(0), T_{OFF}(1)\}$) and the turning-on intervals (such as $\{T_{ON}(0), T_{ON}(1)\}$) may correspond to the non-conducting state and the conducting state of the current switch Q, respectively. Regarding the same period T, $T_{OFF}(1)<T_{OFF}(0)$ and $T_{ON}(1)>T_{ON}(0)$, where $T_{OFF}(0)+T_{ON}(0)=T_{OFF}(1)+T_{ON}(1)=T$. In comparison with the left half of FIG. 3, the currents $I_L$ and $I_Q$ shown in the right half of FIG. 3 have a longer turning-on interval $T_{ON}(1)$ which increases continuously in turning-on interval $T_{ON}(1)$ (e.g. $T_{ON}(1)>T_{ON}(0)$), and may keep increasing to a higher value in the turning-on interval $T_{ON}(1)$, making the area under the current curve become larger. Since the operation of altering the zero-current detection voltage $V_{ZCD}$ by the power factor enhancement circuit 120 may cause early triggering (e.g. bring forward the trigger time) of the active power factor corrector 110 turning on the current switch Q, all of the turning-on interval $T_{ON}(1)$ of the current switch Q, the maximum of the current $I_Q$ and the integral amount of the current $I_Q$ (e.g. the area under the curve thereof) may increase, wherein the power factor enhancement circuit 120 boosts the energy at the input terminal of the active power factor corrector 110 (e.g. the energy stored by the inductor L), making the input current (e.g. the current $I_L$) perfectly follow the target, to enhance the power factor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
a power supply circuit, for providing power to a load in the electronic device, the power supply circuit comprising:
an alternating current-to-direct current (AC-to-DC) converter, arranged to convert an AC power signal into a DC power signal;
a transformer, comprising a primary side and a secondary side, wherein a first terminal of the primary side is coupled to the AC-to-DC converter, and a second terminal of the secondary side is coupled to a ground voltage level;
a first current switch, wherein a first terminal of the first current switch is coupled to a second terminal of the primary side of the transformer, and a second terminal of the first current switch is coupled to the ground voltage level via an impedance component;
a switch control circuit, coupled to a first terminal of the secondary side of the transformer, a control terminal of the first current switch and the second terminal of the first current switch, for setting the first current switch to be in a conducting state or a non-conducting state; and
a power factor enhancement circuit, coupled to the AC-to-DC converter and the first terminal of the secondary side of the transformer;
wherein when the switch control circuit determines that a detection voltage on the second terminal of the first current switch is greater than a first predetermined voltage, the switch control circuit sets the first current switch to be in the non-conducting state; when the switch control circuit determines that a zero-current detection voltage at the first terminal of the secondary side of the transformer is less than a second predetermined voltage, the switch control circuit sets the first current switch to be in the conducting state; and when the DC power signal is greater than a predetermined input voltage level, the power factor enhancement circuit sets the zero-current detection voltage to be less than the second predetermined voltage, in order to make the switch control circuit set the first current switch to be in the conducting state.

2. The electronic device of claim 1, wherein the power factor enhancement circuit comprises:
   a comparison circuit, coupled to the AC-to-DC converter, the comparison circuit arranged to compare the DC power signal with the predetermined input voltage level; and
   a voltage adjustment circuit, coupled to the comparison circuit and the first terminal of the secondary side of the transformer;
   wherein when the comparison circuit determines that the DC power signal is greater than the predetermined input voltage level, the voltage adjustment circuit sets the zero-current detection voltage to be less than the second predetermined voltage, in order to make the switch control circuit set the first current switch to be in the conducting state.

3. The electronic device of claim 2, wherein the voltage adjustment circuit comprises a second current switch, and the second current switch is coupled between the first terminal of the secondary side of the transformer and the ground voltage level; the comparison circuit is coupled to a control terminal of the second current switch; and when the comparison circuit determines that the DC power signal is greater than the predetermined input voltage level, the comparison circuit sets the second current switch to be in a conducting state to make the zero-current detection voltage be less than the second predetermined voltage, in order to make the switch control circuit set the first current switch to be in the conducting state of the first current switch.

4. The electronic device of claim 3, wherein when the comparison circuit determines that the DC power signal is less than the predetermined input voltage level, the comparison circuit sets the second current switch to be in a non-conducting state.

5. The electronic device of claim 1, wherein the switch control circuit adopts a pulse width modulation to set the first current switch to be in the conducting state or the non-conducting state.

6. The electronic device of claim 1, wherein the switch control circuit adopts a pulse frequency modulation to set the first current switch to be in the conducting state or the non-conducting state.

7. The electronic device of claim 1, wherein the current switch is implemented with at least one transistor.

8. The electronic device of claim 1, wherein the impedance component is implemented with at least one resistor.

9. The electronic device of claim 1, wherein the power supply circuit provides power to other circuits in the electronic device via a set of power output terminals, wherein the load represents said other circuits.

10. The electronic device of claim 1, further comprising:
    other circuits, coupled to the power supply circuit, wherein the power supply circuit provides power to said other circuits, and the load represents said other circuits.

11. A power supply circuit, arranged to provide power to a load, the power supply circuit comprising:

an alternating current-to-direct current (AC-to-DC) converter, arranged to convert an AC power signal into a DC power signal;
a transformer, comprising a primary side and a secondary side, wherein a first terminal of the primary side is coupled to the AC-to-DC converter, and a second terminal of the secondary side is coupled to a ground voltage level;
a first current switch, wherein a first terminal of the first current switch is coupled to a second terminal of the primary side of the transformer, and a second terminal of the first current switch is coupled to the ground voltage level via an impedance component;
a switch control circuit, coupled to a first terminal of the secondary side of the transformer, a control terminal of the first current switch and the second terminal of the first current switch, for setting the first current switch to be in a conducting state or a non-conducting state; and
a power factor enhancement circuit, coupled to the AC-to-DC converter and the first terminal of the secondary side of the transformer;
wherein when the switch control circuit determines that a detection voltage on the second terminal of the first current switch is greater than a first predetermined voltage, the switch control circuit sets the first current switch to be in the non-conducting state; when the switch control circuit determines that a zero-current detection voltage at the first terminal of the secondary side of the transformer is less than a second predetermined voltage, the switch control circuit sets the first current switch to be in the conducting state; and when the DC power signal is greater than a predetermined input voltage level, the power factor enhancement circuit sets the zero-current detection voltage to be less than the second predetermined voltage, in order to make the switch control circuit set the first current switch to be in the conducting state.

12. The power supply circuit of claim 11, wherein the power factor enhancement circuit comprises:
    a comparison circuit, coupled to the AC-to-DC converter, the comparison circuit arranged to compare the DC power signal with the predetermined input voltage level; and
    a voltage adjustment circuit, coupled to the comparison circuit and the first terminal of the secondary side of the transformer;
    wherein when the comparison circuit determines that the DC power signal is greater than the predetermined input voltage level, the voltage adjustment circuit sets the zero-current detection voltage to be less than the second predetermined voltage, in order to make the switch control circuit set the first current switch to be in the conducting state.

13. The power supply circuit of claim 12, wherein the voltage adjustment circuit comprises a second current switch, and the second current switch is coupled between the first terminal of the secondary side of the transformer and the ground voltage level; the comparison circuit is coupled to a control terminal of the second current switch; and when the comparison circuit determines that the DC power signal is greater than the predetermined input voltage level, the comparison circuit sets the second current switch to be in a conducting state to make the zero-current detection voltage be less than the second predetermined voltage, in order to make the switch control circuit set the first current switch to be in the conducting state of the first current switch.

14. The power supply circuit of claim 13, wherein when the comparison circuit determines that the DC power signal is less than the predetermined input voltage level, the comparison circuit sets the second current switch to be in a non-conducting state.

15. The power supply circuit of claim 11, wherein the switch control circuit adopts a pulse width modulation to set the first current switch to be in the conducting state or the non-conducting state.

16. The power supply circuit of claim 11, wherein the switch control circuit adopts a pulse frequency modulation to set the first current switch to be in the conducting state or the non-conducting state.

\* \* \* \* \*